E. W. TABER.
FARM TRACTOR.
APPLICATION FILED SEPT. 18, 1919.
1,423,046.
Patented July 18, 1922.
4 SHEETS—SHEET 1.
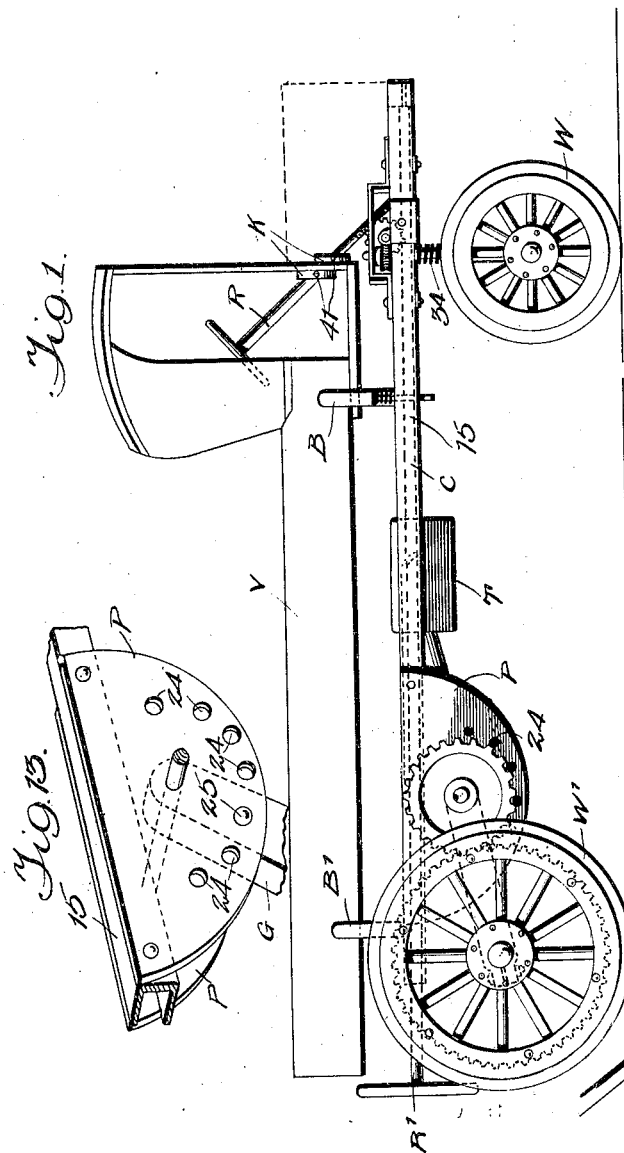
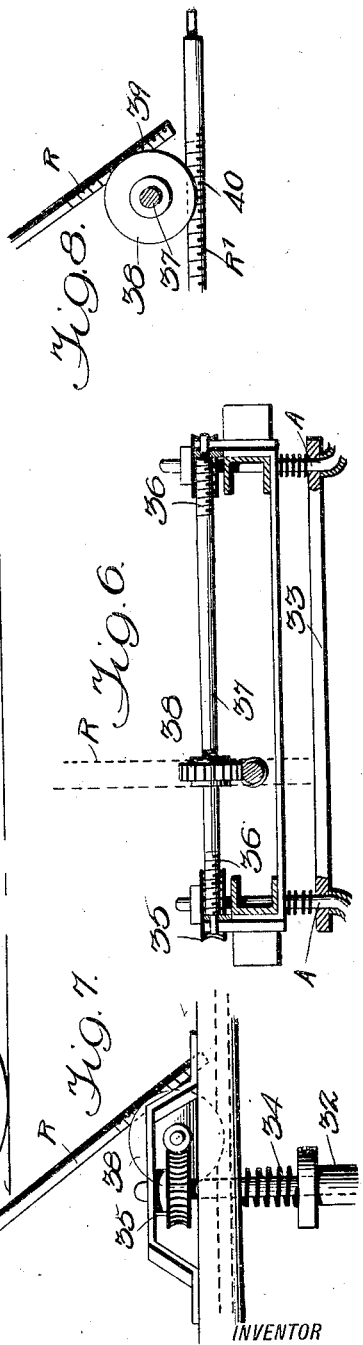
WITNESSES
INVENTOR
E. W. TABER,
BY
ATTORNEYS

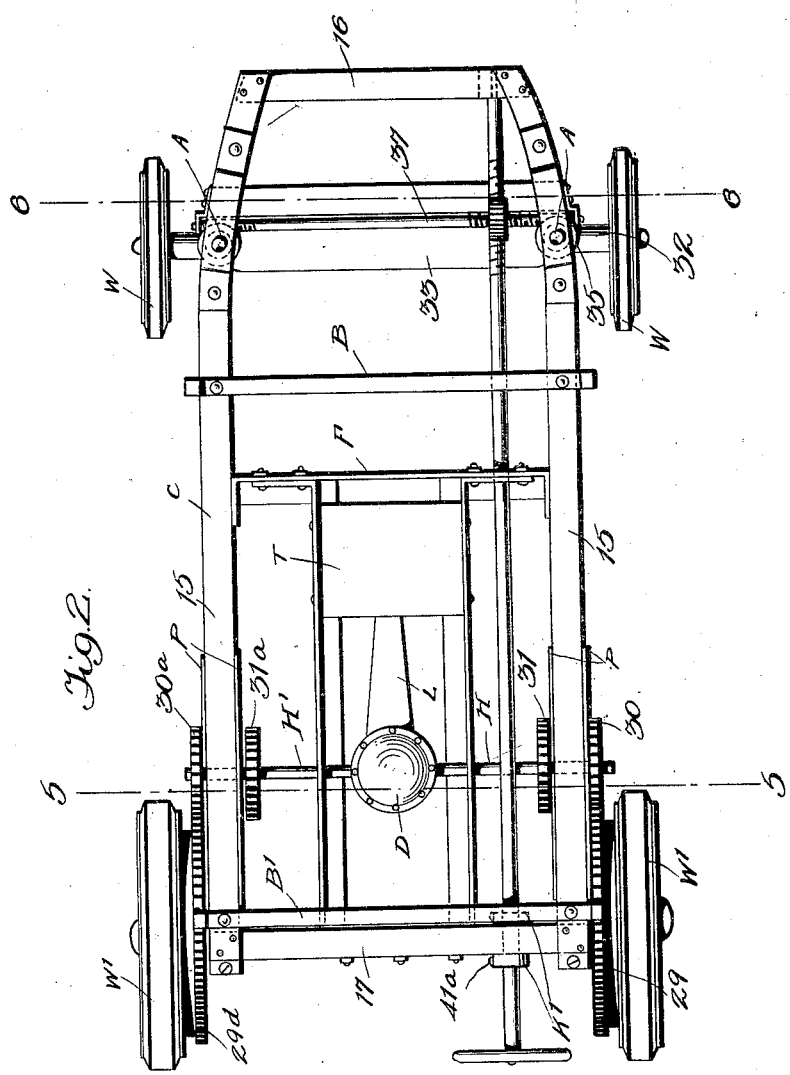

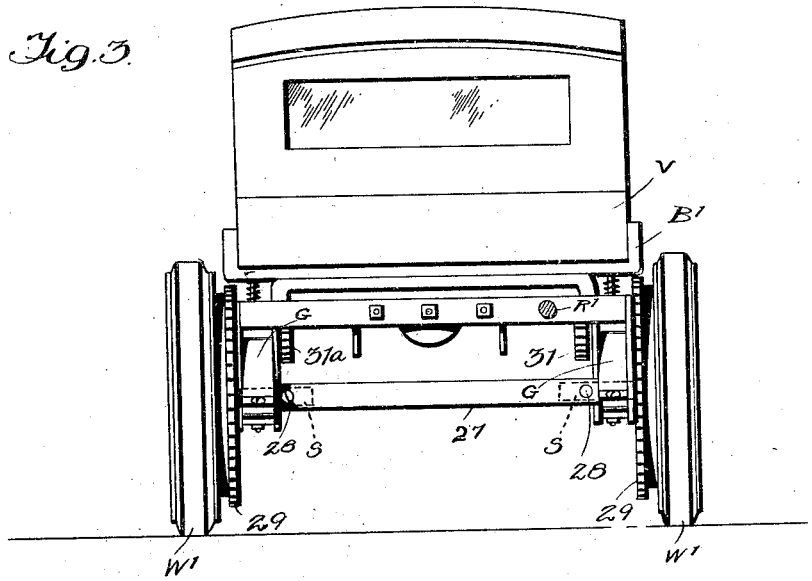
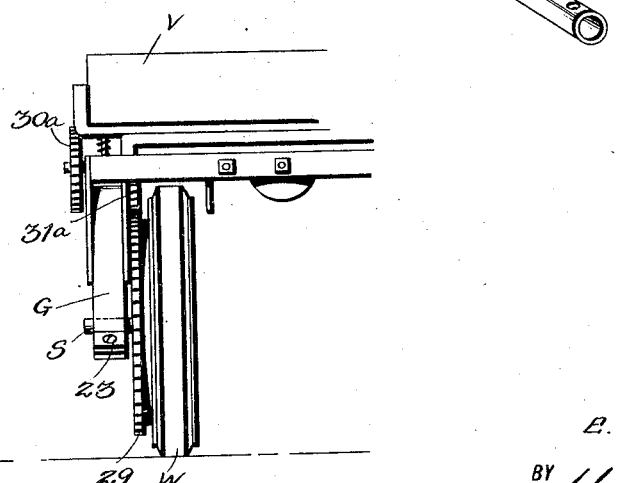

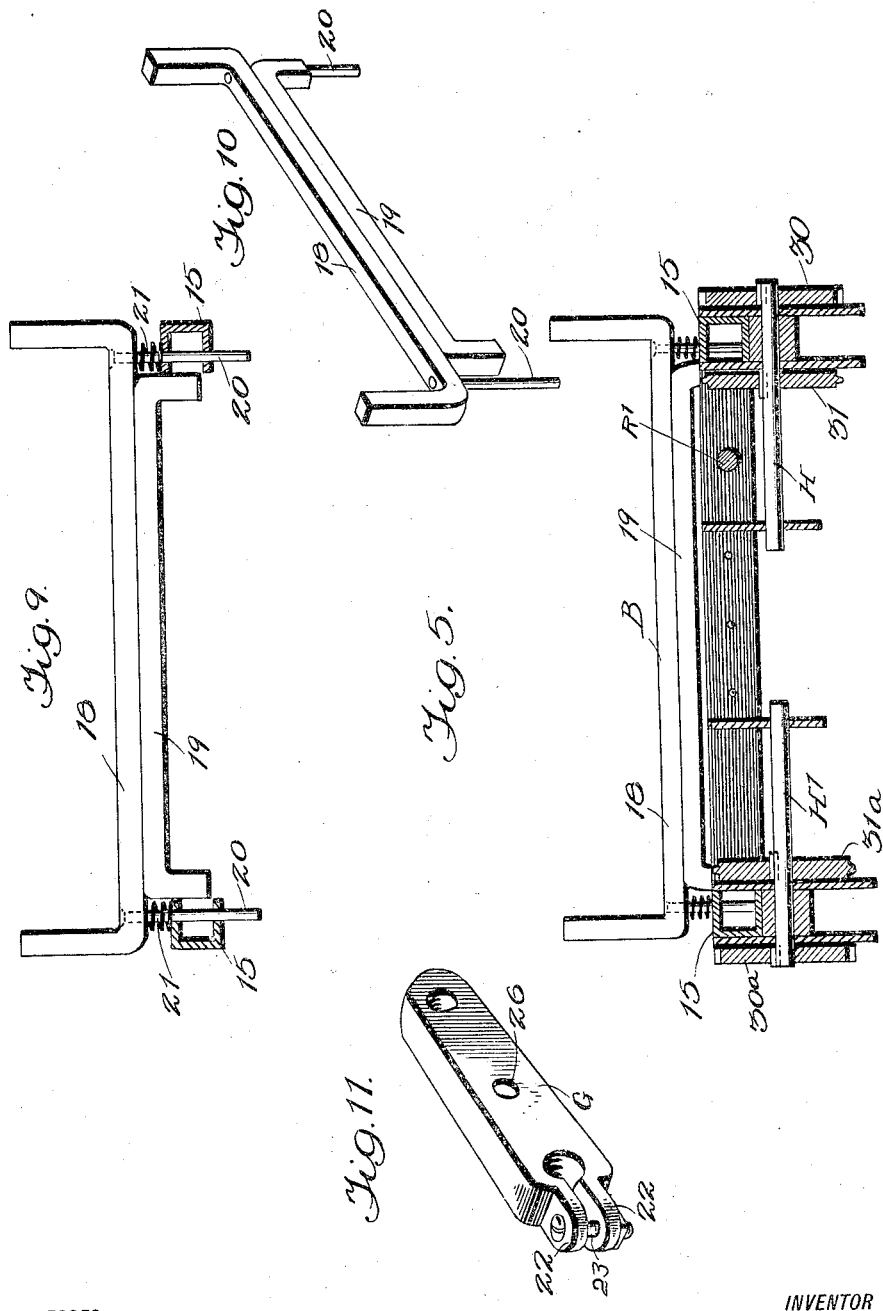

UNITED STATES PATENT OFFICE.

EZRA W. TABER, OF CHICAGO, ILLINOIS.

FARM TRACTOR.

1,423,046. Specification of Letters Patent. Patented July 18, 1922.

Application filed September 18, 1919. Serial No. 324,406.

*To all whom it may concern:*

Be it known that I, EZRA W. TABER, a citizen of the United States, and a resident of Chicago Heights, in the county of Cook and State of Illinois, have invented certain new and useful Improvements in Farm Tractors, of which the following is a specification.

My invention relates generally to tractors and particularly to farm tractors for hauling farming implements of various descriptions.

It is a purpose of my invention to provide a tractor having means at the front of the vehicle for steering the same which is operable by steering rods disposed at the front and rear of the vehicle, such rods being capable of movement to an inoperative position so that one or the other can actuate the steering mechanism independently of the other.

It is also a purpose of my invention to provide a driving mechanism for the rear wheels of the tractor which is constructed to drive the wheels from two positions, such wheels being reversible so as to permit the hauling of cultivators of various sizes.

I will describe one form of farm tractor embodying my invention and will then point out the novel features in claims.

In the accompanying drawings:

Figure 1 is a view showing in side elevation one form of farm tractor embodying my invention;

Figure 2 is a top plan view of Figure 1;

Figure 3 is a view showing in rear elevation the tractor shown in the preceding views;

Figure 4 is a fragmentary view similar to Figure 3 showing one of the driving wheels in reversed position;

Figure 5 is a transverse sectional view taken on line 5—5 of Figure 2;

Figure 6 is a transverse sectional view taken on line 6—6 of Figure 2;

Figure 7 is an enlarged detail view of a portion of Figure 1, showing a part of the steering mechanism;

Figure 8 is a view similar to Figure 7 with adjusted parts omitted to show the precise construction of the steering mechanism; and Figures 9 to 13 are detail views of the tractor.

Similar reference characters refer to similar parts in each of the several views.

Referring specifically to the drawings, and particularly to Figures 1 and 2, C designates a chassis upon which is arranged a pair of bolsters B and B' for resiliently supporting a vehicle body V thereon. As shown in Figure 2 the chassis C comprises side rails 15, a front rail 16, and a rear rail 17. As shown in Figures 5, 9 and 10, each bolster B and B' comprises reversely disposed U-shaped bars 18 and 19 supported upon vertically disposed rods 20—20 which are secured within the upper bars 18. The rods 20—20 have a sliding fit within suitable openings formed in the side rails 15, and interposed between the rails 15 and the bars 18 are coiled springs 21 which normally bias the bolsters upwardly so as to resiliently support the vehicle body V.

It will be understood that the vertical portion of the bars 18 embrace the sides of the vehicle body and thus hold the same in proper position upon the chassis.

The chassis C is supported by front wheels W and rear wheels W', the latter of which constitute the driving wheels. As shown to advantage in Figure 4, each of the driving wheels is mounted upon a stub axle S. The stub axles S are supported in brackets G, each of which is pivotally supported at its upper end between a pair of semicircular plates P, secured to the opposite sides of the rails 15. As shown in Figure 11, each bracket G comprises a single length of material which is bifurcated at its lower end to form clamping jaws 22 through which extends a bolt 23 for actuating the jaws to effect the clamping of the stub shaft S. The driving wheels W' are adapted to be adjusted vertically so as to lower or elevate the rear of the tractor to accomplish obvious advantages in the hauling of farming implements. To effect this vertical adjustment I provide each pair of plates P with a semicircular series of registering openings 24, any pair of which is adapted to receive a locking pin 25 which extends through an opening 26 formed in the bracket G and thereby locks the bracket in adjusted position within the radius of the openings. The construction of the plates and the manner in which the locking of the brackets G is effected is clearly shown in Figure 13.

As shown in Figure 3, the driving wheels W' are disposed upon the outer sides of the chassis C, and when in this position, which position I will term the "expanded" position, the stub axles S extend inwardly from the wheels with their inner ends projecting from the confronting sides of the brackets G. In order to reinforce the stub axles S, I provide a tubular sleeve 27 which receives the confronting ends of the axles S and S' and is rigidly connected thereto by bolts 28, thus forming a rigid connection between the two axles. The wheels W' are adapted to be placed upon the inner sides of the brackets G, as illustrated in Figure 4. This position of the driving wheels I term the "contracted" position. In order to reverse the wheels from the expanded to the contracted position, the axles S and S' are removed from the brackets by loosening the bolts 28, whereupon they are again inserted into the brackets from the inner sides thereof.

To drive the wheels W' when in contracted or expanded position, I provide one side of each wheel with a relatively large gear 29 and 29ª, respectively, which is adapted to mesh with a pair of relatively small gears 30 and 31, and 30ª and 31ª, respectively. The gears 30 and 31 are fixed to a shaft H, while the gears 30ª and 31ª are fixed to a shaft H', such shafts H and H' being operatively connected at their inner ends by means of a suitable form of differential inclosed in a casing D. L designates the shaft casing for transmitting motion from the transmission contained in a casing T carried by the frame F. It will be understood that the transmission, driving shaft, and differential have not been shown as they may be of any suitable form and do not constitute any part of the present invention.

From this arrangement it will be seen that the shafts H and H' drive the wheels W' through the gears 29, 29ª, 30, etc. When the wheels W' are in the expanded position, the gears 29 and 29ª mesh with the gears 30 and 30ª, but when such wheels are in the contracted position their gears mesh with the gears 31 and 31ª. It will thus be seen that a positive driving means is provided for the driving wheels when in expanded or contracted position. The purpose of reversibly mounting the driving wheels is to accommodate the tractor to large or small cultivators. For example, should a single row cultivator be attached to the rear end of the tractor the drive wheels W' are placed in the contracted position. When the tractor is hauling a cultivator which is capable of working two or more rows, the drive wheels are placed in the expanded position.

Referring now to Figures 1 and 2, the wheels W constitute the steering wheels of the vehicle, and in order to steer the vehicle from the front or rear thereof, I provide the following mechanism:

A designates the axles for the wheels W, which, as shown to advantage in Figure 2, are of L-shaped formation and are inclosed in casings 32. The vertical portion of each shaft A is suitably journaled in the chassis C and a beam 33, which is disposed below the chassis, and wholly supported by the axle. Interposed between the beam 33 and the chassis C are coiled springs 34 which surround the vertical portions of the shaft A and serve to resiliently support the forward end of the chassis upon the wheels W. Fixed to the vertical portions of the shaft A are worm gears 35, which, as shown in Figures 6 and 7, are adapted to mesh with worms 36 formed on the opposite ends of a shaft 37. Fixed to the shaft 37 is a worm gear 38 which is adapted to be rotated in one direction or the other by means of steering rods R and R' which are formed with worms 39 and 40, respectively, as clearly shown in Figure 8. The steering rod R extends upwardly into a proper position in relation to the operator's seat on the body V, and, as will be understood, is adapted to be operated when the driver is at the forward end of the vehicle. The steering rod R' extends longitudinally of the chassis C and projects from the rear end thereof, as clearly shown in Figure 2, so that the vehicle may be steered from the rear. As I have illustrated the steering rods R and R' in Figure 8, the worms 39 and 40 mesh with the gear 38, but it is to be understood that when one or the other of such steering rods is being used the remaining rod is disconnected from the gear 38. To this end, the steering rods R and R' are normally locked in operative position with relation to the gear 38 by means of collars K and K', respectively, which are arranged upon opposite sides of the dash of the vehicle body V and the rear of the rail 17 of the chassis, respectively. These collars K and K' are provided with set screws 41 and 41ª, respectively, which serve to lock the collars in any desired position upon the steering rod. Assuming that it is desired to steer the tractor through the medium of the steering rod R, it will be necessary to disconnect the steering rod R' from the worm gear 38. To effect this end, the collars K', disposed upon opposite sides of the rail 17, are released by their set screws so that the steering rod R' can be moved rearwardly, thus moving its worm 40 clear of the gear 38. In this position of the steering rod R' the manipulation of the worm gear 38 in no way affects the steering rod so that the wheels W may be moved to any desired position independently of the steering rod R'. If it is desired to steer the vehicle from the rear, it will be understood that the steering rod R is moved to the inactive position, in a manner similarly described in relation to the steering rod R'. In the inactive position of the steering rod, the collars K or K' are locked to the rods in the position shown in the drawing, so that the rods may be rotated but can not move longitudinally.

Although I have herein shown and described only one form of tractor embodying my invention, it is to be understood that various changes and modifications may be made without departing from the spirit of the invention and spirit and scope of the appended claims.

I claim:

1. In a tractor, a chassis, brackets adjustably mounted on said chassis, driving wheels having stub axles journaled on said brackets, said driving wheels being adapted to be selectively arranged on the inner or outer sides of said brackets, gears carried by said driving wheels, driving shafts having a differential connection and a plurality of sets of gears carried by said driving shafts, one of said sets of gears being engaged with the gears of the driving wheels when said driving wheels are arranged on the outer sides of said brackets, and the other of said sets of gears being engageable with the gears of the driving wheels when said driving wheels are arranged on the inner sides of said brackets.

2. In a tractor, a chassis, brackets adjustably mounted on said chassis, driving wheels having stub axles journaled on said brackets, said driving wheels being adapted to be selectively arranged on the inner or outer sides of said brackets, gears carried by said driving wheels, driving shafts having a differential connection and a plurality of sets of gears carried by said driving shafts, one of said sets of gears being engaged with the gears of the driving wheels when said driving wheels are arranged on the outer sides of said brackets, and the other of said sets of gears being engageable with the gears of the driving wheels when said driving wheels are arranged on the inner sides of said brackets, and a sleeve receiving the ends of said stub axles and secured thereto when said driving wheels are arranged on the outer sides of said brackets.

3. In a tractor, a chassis including side members, a pair of plates secured to each of said side members, a bracket pivotally mounted between the plates of each pair, cooperating means between the plates and the brackets for adjustably securing the brackets in adjusted position, driving wheels having stub axles journaled in said brackets, the driving wheels being adapted to be arranged on either side of said brackets, and means for driving said wheels in either of these positions.

EZRA W. TABER.